March 26, 1968  W. R. KEOUGH  3,374,996
METHOD AND APPARATUS FOR CONVEYING WORKPIECES
Filed Jan. 22, 1965  2 Sheets-Sheet 1
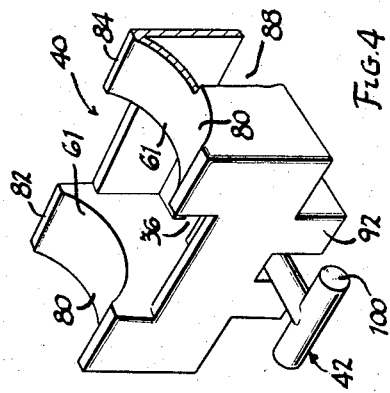
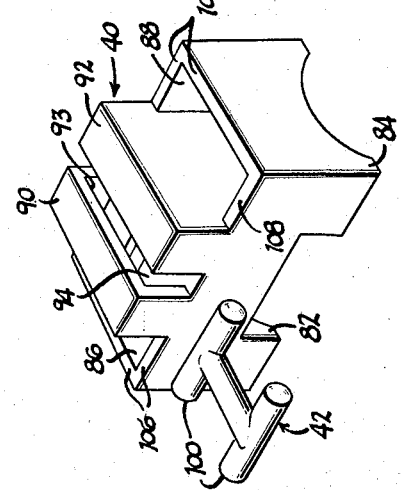
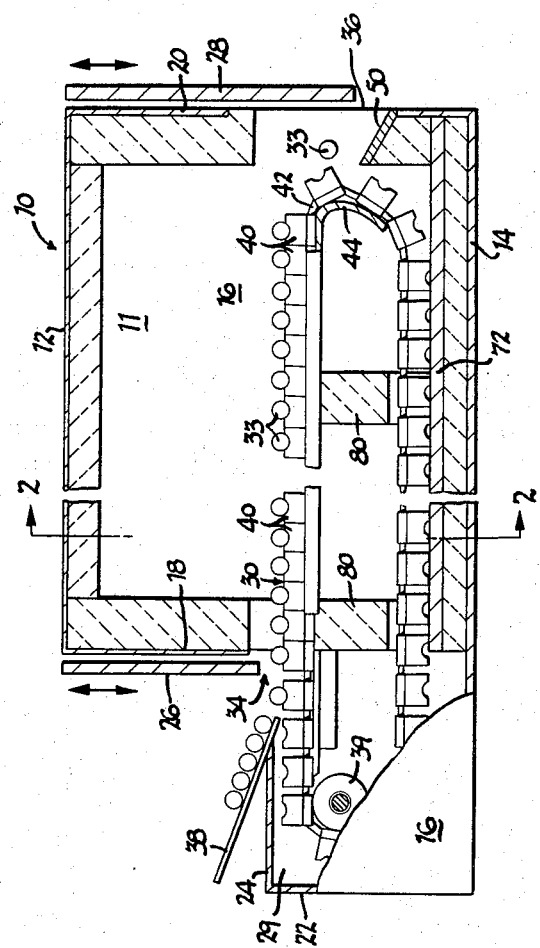
INVENTOR.
WILLIAM R. KEOUGH March 26, 1968  W. R. KEOUGH  3,374,996
METHOD AND APPARATUS FOR CONVEYING WORKPIECES
Filed Jan. 22, 1965  2 Sheets-Sheet 2

INVENTOR.
WILLIAM R. KEOUGH

United States Patent Office 3,374,996
Patented Mar. 26, 1968

3,374,996
METHOD AND APPARATUS FOR
CONVEYING WORKPIECES
William R. Keough, 124 S. Williamsbury,
Birmingham, Mich. 48127
Filed Jan. 22, 1965, Ser. No. 427,422
11 Claims. (Cl. 263—8)

ABSTRACT OF THE DISCLOSURE

The invention includes conveyor apparatus for a heat treating furnace, the conveyor comprising a series of links interconnected loosely by separate tie members and looped around a driving means on the outside of the furnace and a stationary direction changing means on the inside of the furnace to provide a circulatory conveyor. The tie members are loosely disposed relative to the links so that the links can be pushed along an upper skid structure in the material carrying phase of the conveyor movement with the links in surface-to-surface abutting relation and with the tie members exerting no driving force on the links. The links then pass around the stationary direction changing structure, and at this point the links separate from each other and the tie members become engaged. The links are then pulled along a lower skid structure with driving force being transmitted from link-to-link by the tie members. The links thus travel through the work carrying phase of movement at one pitch, and travel through the return phase of movement at a different pitch.

Background of the invention

This invention relates to conveying apparatus having workpiece transporting interconnected links and more particularly to an improved system, including method and apparatus for conveying workpieces, such as metal billets to be treated, through a temperature controlled environment in a manner obviating relative movement between the conveyor and the material, and insuring positive discharge of the workpieces upon demand, following treatment at a predetermined location.

Illustratively speaking, prior art commercial heat treating furnace conveyor installations have generally, in the recent past, utilized a pair of spaced oppositely rotating screw conveyors for moving billets or blanks through the furnace by surface rotation of the screws against the billets. In this way, the billets are also centered as they are moved through the furnace by the screws. In such installations, the emerging heat treated billets exhibit a substantial amount of surface damage in the form of scuff marks and scars caused by the relative movement of the screw conveyors against the surface of the billets. When the billets are subsequently fabricated, as, for example, by extruding copper billets into copper tubing, much of the surface damage is retained, necessitating costly discarding or refabricating of the section of the defective copper tubing. Further, because of the relative movement between the screw conveyors and the billets, uniform spacing is not maintained between successive billets along the conveyor and, hence, discharge of billets from the furnace is irregular and unpredictable and, consequently, not easily coordinated with the demand for billets.

Previous attempts to provide a system for conveying billets or like workpieces through a furnace so as to prevent movement between each workpiece and the workpiece carrying fixtures of the conveyor have failed to produce a commercially feasible system.

Objects of the invention

Accordingly, paramount objects of this invention include providing a novel, simplified, commercially practicable system, including method and apparatus, for conveying workpieces through a controlled environment having one or more of the following features:

(1) Provision for avoidance of surface damage to the workpieces;

(2) Provision for positively discharging of workpieces upon demand at predetermined locations;

(3) Provision for successively discharging one workpiece per station advance of the conveying system according to demand;

(4) Provision for non-rotatable, stationary conveyor supports and for stationary direction changing means within a temperature controlled and/or atmosphere controlled environment, thereby avoiding any requirement for rotating parts or for a rotatable conveyor direction changing idler and like structure within the controlled environment;

(5) Provision for moving the conveyor apparatus through the controlled environment so as to generate only frictional and gravitational forces;

(6) Provision for conveyor movement controlling components external of the controlled environment; and (7) Provision of a novel, reversible conveyor link.

These and other objects and features of the present invention will become more fully apparent from the appended claims as the ensuing detailed description and discussion proceeds in conjunction with the accompanying drawings in which:

FIGURE 1 is a schematic longitudinal cross section of a heat treating furnace utilizing a presently preferred conveying embodiment of the present invention;

FIGURE 4 is an enlarged perspective of the presently preferred link and dog conveyor structure in the upright position; and FIGURE 5 is a perspective similar to FIGURE 4 illustrating the link in the inverted position and the dog exploded away from the link for purposes of clarity.

Figure 2:
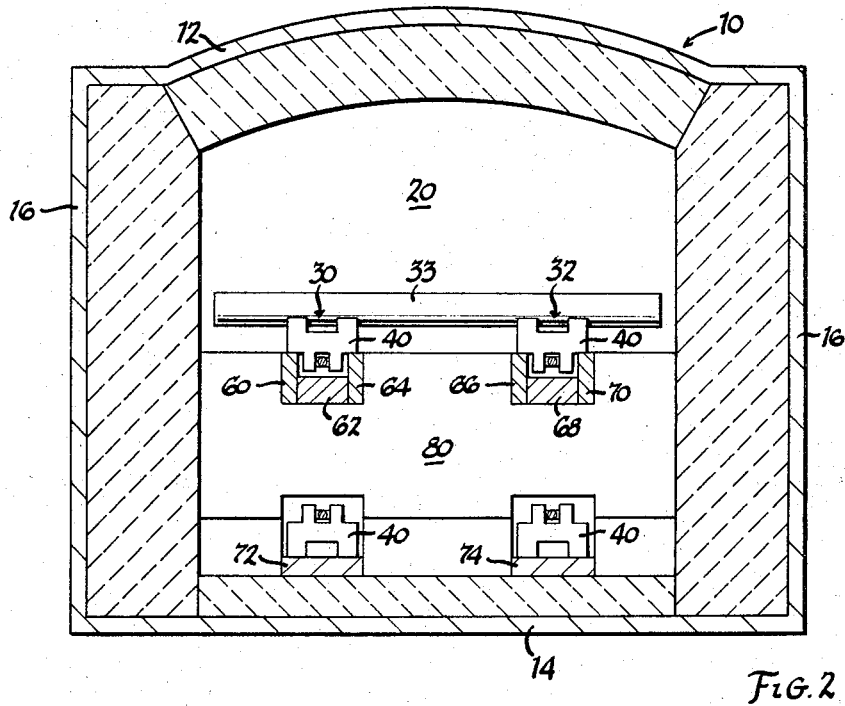
FIGURE 2 is a schematic transverse cross section of the structure of FIGURE 1 taken along line 2—2 thereof.

Reference is now made in detail to the drawings wherein like numerals indicate like parts throughout. Heat treating furnace 10 is diagrammatically illustrated in longitudinal cross section in FIGURE 1. Furnace 10 may be of the conventional commercial type used, for example, to bring metal billets to a temperature sufficient to accommodate extrusion of the billet into final product form, e.g., into copper tubing when copper billets are being utilized. A temperature controlled and, if desired, atmosphere controlled environment 11 is defined generally by the enclosure formed intermediate top 12, bottom 14, sides 16, front and rear walls 18 and 20, all of which are insulated in well known manner, as well as by vertically displaceable front and rear doors 26 and 28. Walls 22 and 24, along with the forward part of bottom 14, define a pair of chambers 29 removed from temperature controlled environment 11 which house conveyor drive apparatus. Furnace 10 is equipped with suitable burners (not shown).

A pair of spaced, identical, parallel conveyors indicated generally at 30 and 32 transport billets 33 through the controlled environment 11 of furnace 10 between inlet 34 and discharge outlet 36. Billet magazine 38 is provided for storage and may have means for selectively delivering raw billets upon manual demand or in accord with any desired predetermined programmed sequence. A preferred apparatus for delivery or charging the raw billets appropriately upon the links of conveyors 30 and 32 is disclosed in my copending United States application Ser. No. 427,354, filed on even date herewith (now Patent No. 3,312,454, issued Apr. 4, 1967). The raw billets from magazine 38 are sequentially charged or delivered to the concave links of conveyors 30 and 32 in timed relation to the delivery of the conveyor links 30 to the upper substantially horizontal travel path of the conveyors by drive sprockets 39. Sprockets 39, as well as the prime mover therefor (not shown), may be of any conventional commercial design. The reciprocating conveyor prime mover apparatus disclosed in copending United States application Ser. No. 427,354, filed on even date herewith may be employed.

Conveyors 30 and 32 are each made of a series of links 40 interconnected by dogs 42, which are shaped in the form of an H.

By inspection of FIGURE 1, it will be seen that conveyors 30 and 32 travel through the upper horizontal or primary travel path in a manner so that adjacent links 40 are in contiguous abutting relationship, i.e., the center-to-center spacing or pitch of the links is equal to the length of one link. However, during the return travel path of conveyors 30 and 32, i.e., intermediate stationary direction changing abutment 44 and drive sprockets 39, adjacent links 40 are spaced from each other a distance permitted by the interconnecting dogs 42, i.e., at a center-to-center spacing or pitch greater than the overall length of one link.

Restated, conveyors 30 and 32 are pushed by drive sprockets 39 along the upper horizontal portion of their travel paths with links 40 in contiguous abutting relation and are pulled around the forward and rear direction changing devices, namely, stationary abutment 44 and sprockets 39, as well as the lower horizontal portion of the travel path of conveyors 30 and 32 with links 40 spaced from each other.

The upper primary reach of the overall conveyor 30 is under compression from the sprocket 39 or other drive mechanism pushing the links into abutment. The lower return reach of the conveyor 30 is under tension, since the links 40 are being pulled to the left (in FIGURE 1) by the sprocket. The transition from compression to tension occurs at the abutment 44, and the transition from tension to compression occurs at the sprocket 39.

Conveyors 30 and 32 require no moving apparatus within the controlled environment 11. Therefore, links 40 create no rotational movement during their motion through the temperature controlled environment of furnace 10. Stationary abutment 44 provides a sliding surface over which links 40 consecutively pass. By this mode of construction, the need for a rotating idler for conveyors 30 and 32 is obviated. Consequently, the present conveying apparatus materially reduces the cost of maintenance and repair when compared with prior commercial heat treating conveyors.

Figure 3:
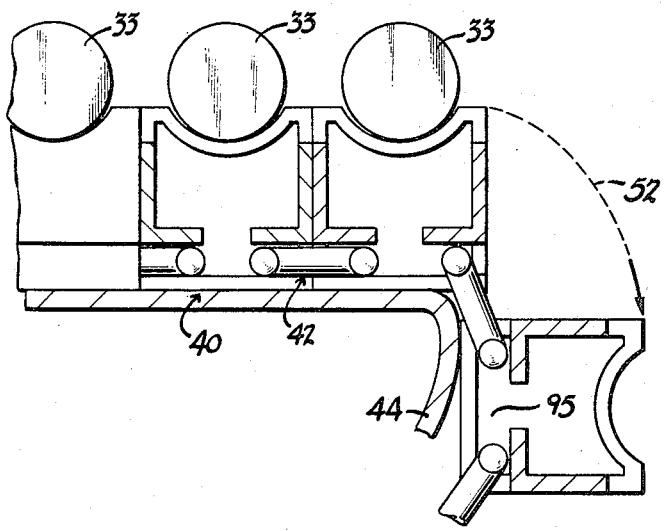
FIGURE 3 is an enlarged cross section through the linkage of the endless conveyor of FIGURE 1 at the discharge end of the heat treating furnace illustrating one preferred stationary direction changing structure comprehended by this invention.

At the rear direction changing or discharging position of conveyors 30 and 32, i.e., at stationary abutment 44, links 40 are changed from their closed spacing to their open spacing. For each step advance of drive sprocket 39, one link 40 will tumble downward over stationary abutment 44, thereby causing the change in pitch. This phenomenon is best illustrated in FIGURE 3. As a link 40 falls downward over abutment 44, its movement is substantially curvilinear such that the upper surface of link 44 adjacent the billet 33 moves arcuately a greater distance than do lower parts of link 40 as illustrated by arrow 52 of FIGURE 3. Consequently, the speed of the upper portion of the link is considerably greater than the lower portion of the link, resembling somewhat the movement of the fingertips with respect to the wrist of a human being during the act of throwing a baseball. This movement of link 40 about the upper elevation of stationary abutment 44 unerringly insures positive, successive dumping of the heated billets from their cradled position upon aligned links 40 along discharge chute 50 through discharge port 36, even when a heated billet has become partially fused to its associated links 40.

Links 40 are preferably supported through most of the upper horizontal portion of the travel paths of conveyors 30 and 32 by refractory or heat resistant, i.e., carbide skids 60 and 64, and 66 and 70 which are held in spaced relation by beams 62 and 68, respectively (FIGURE 2). Similarly, the inverted links 40 are frictionally supported along the major portion of the lower travel paths of conveyors 30 and 32 by carbide beams 72 and 74, respectively, best illustrated in FIGURE 2. Hence, the only forces acting upon links 40 of conveyors 30 and 32 through the temperature controlled environment 11 of furnace 10 are frictional and gravitational. The frictional forces, of course, are created by engagement of links 40 with carbide skids 60, 64, 66 and 70 and carbide beams 72 and 74, while the gravitational force is effectual as links 40 change direction about stationary abutment 44. Skids 60, 64, 66 and 70 and beams 72 and 74 are rigidly held in position by spaced vertical piers 80 appropriately positioned to adequately support the weight load of the billets and the conveyors.

The detailed structure of links 40 and dogs 42 is at best illustrated in FIGURES 4 and 5 to which reference is now made. Significantly, each link 40 (and also each dog 42) is symmetrical so that it may be reversed in the conveyor chain following wear or slight deformation due to use thereby materially increasing the useful life of the conveyor links. Each link 40 is adapted to cradle a billet 33 in concave surfaces 80 of saddle projections 82 and 84. The underside of saddle projections 82 and 84 are hollow open grooves thereby providing recesses 86 and 88, respectively, as seen by inspection of FIGURES 4 and 5. Recesses 86 and 88 are adapted to receive spaced dogs, as, for example, dogs mounted upon drive sprocket 39, for pushing conveyors 30 and 32 along the upper portion of their travel paths and for pulling the conveyors through the lower portion of their travel paths.

The entrance to recesses 86 and 88 are circumscribed on three sides by surfaces 106 and 108, respectively. Surfaces 106 and 108 normally engage the upper surface of carbide skids 60 and 66, and 64 and 70, respectively, during movement of links 40 across the upper horizontal portion of the travel path of conveyors 30 and 32.

Each link 40 has a pair of hollow extensions 90 and 92 separated by slot 94 and having open confronting faces 93. Extensions 90 and 92 combine to provide a reentrant chamber 95 opening through the central slot 94 to receive one transverse leg 100 each of a pair of dogs 42 located fore and aft, respectively, of link 40, in the manner illustrated in FIGURE 4. The ends of legs 100, while illustrated to be constant in cross section, may be chamfered or rounded, if desired. The dogs 42 serve no function in the advancement of the links in compression but serve the vital function of retaining adjacent links in assembly when subjected to tension at the abutment 49, the sprocket 39 and the return reach of the conveyor. The dogs 42 are assembled by longitudinally aligning the legs 100 thereof with the slots 94, inserting the legs through the slots and then turning the dogs 42 one-quarter of a turn so that the legs 100 lie normal to the length of the slot 94. The legs 100 then abut the ends of the reentrant chambers.

In synopsis, the present invention comprehends conveying apparatus for moving metal workpieces, such as copper billets, through a temperature controlled heat treating environment within a furnace in such a way as to avoid scarring the surface of the billets and to insure that a single treated billet is unerringly dumped from its cradled position upon the conveyor links onto the discharge chute for each step advance of the conveyor. The movement of the conveyor may be manually controlled for delivery of treated billets upon irregular demand or for sequential delivery of treated billets, in accordance with a predetermined timed program. The conveying apparatus of the present invention moves through the temperature controlled environment of the furnace without requirement of any movable supporting or conveying structure within the environment. No idler is necessary to change the direction of the conveyor's movement within the environment. Further, the sprocket and prime mover therefor are located remote from the temperature controlled environment of the furnace.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. A billet treating furnace comprising a heating chamber with inlet and outlet and with stationary upper and direction changing skid means, endless conveying means having link means in series supported solely within said heating chamber by said skid means, said link means being extensibly-contractibly interconnected by tie means for moving billets within said heating chamber, and means for frictionally pushing said link means in surface-to-surface abutting relation along said upper skid means through said heating chamber, for causing said link means to successively separate from said surface-to-surface abutting relation a predetermined distance permitted by said tie means at said stationary direction changing skid means and for return pulling said link means and said tie means in etxended relation to the position of origination.

2. A device as defined in claim 1 further including lower skid means whereby said link means and said tie means are return pulled in extended relation to the point of origination by frictional engagement of said link means with said lower skid means.

3. In a furnace for treating metal or like workpieces having inlet, outlet and heat treat chamber, stationary upper, lower and direction changing skid means within said treating chamber, a pair of spaced aligned conveyors movable together with timed relation through predetermined travel paths, automatic means for seriatim loading individual workpieces across both said conveyors, and automatic means external of said treating chamber for driving said conveyors through said travel paths, each said conveyor comprising extensible-contractible aligned series linkage including integral links which directly carry said workpieces through the treating chamber and tie means loosely connecting said links, said links being solely supported within said treating chamber by said skid means so as to permit said conveyors to be frictionally advanced along said upper skid means at a first pitch such that said links are pushed in surface-to-surface abutting relation so that transverse movement of said conveyors is prevented during workpiece carrying phase of said travel path, said pitch being rapidly increasable a predetermined amount by means of said extensible-contractible linkage to cause said links to successively separate from said surface-to-surface abutting relation as permitted by said tie means in a downwardly directed generally arcuate manner as said links frictionally move past said stationary direction changing skid means near said outlet to insure positive successive discharge of treated workpieces from associated links upon and according to demand, one workpiece being discharged for each link advance of said conveyors, said links and said tie means being frictionally pullable along said lower skid means in extended, inverted relation and thereafter returnable to the position of origination by said external driving means.

4. In a method of conveying articles through a controlled environment from a loading station to an unloading station, the steps of superimposing an article on one of a plurality of links at said loading station, said links being relatively movable in the direction of travel of said articles and being interconnected by tie means separate from said links capable of transmitting tensile forces only, abutting a plurality of said links with one another and loosely disposing said tie means relative to said links so that said tie means transmit no compressive forces between said links, pushing said one link by such abutment to said unloading station, inverting said one link at said unloading station to drop said article therefrom, and moving said links during inversion and during return from said unloading station to said loading station by pulling each link from a preceding link by said tie means.

5. In a method of conveying articles through a controlled environment, the steps of: pushing a plurality of conveyor links in contiguous abutting compressive relation with each other from an article loading station to an article unloading station, loosely disposing separate tie means between adjoining ones of said links so that said tie means exert no driving forces on said links, successively situating articles upon successive links, respectively, at the loading station and conveying same to the unloading station solely by compressive forces transmitted from link to link, essentially reversing the direction of travel of the links by successively inverting the links to successively unload the articles at the unloading station, separating said links to engage said tie means with adjoining links to thereby transmit tensile driving forces from link-to-link, returning the links in inverted orientation from the unloading station solely by tensile forces transmitted from inverted link to inverted link by said tie means, and returning the links successively to their upright orientation for reception of additional articles at the loading station.

6. In a method of conveying articles through a controlled environment, the steps of pushing a plurality of conveyor links in contiguous abutting compressive relation with each other from an article loading station to an article unloading station, loosely disposing tie means separate from said links between adjoining links with said tie means exerting no driving forces on said links, successively situating articles upon successive links, respectively, at the loading station and conveying same to the unloading station solely by compressive forces transmitted between the abutting links, essentially reversing the direction of travel of the links by successively inverting the links and simultaneously successively separating the link being inverted out of contiguous abutment with the succeeding link to successively unload the articles at the unloading station, engaging said tie means with the links interconnected thereby so that said tie means transmit tensile driving forces from link-to-link, returning the links in inverted orientation from the unloading station solely by tensile forces transmitted from inverted link to inverted link by said tie means and returning the links successively to their upright orientation for reception of additional articles at the loading station.

7. In a conveyor system a conveyor link having a symmetrical body comprising means for carrying material to be treated through a controlled environment, oppositely disposed means for accommodating joining of successive links to form an endless conveyor, drive engaging means disposed at opposite body locations each being separately orientatable by reversing the position of the link so that each said drive engaging means may be made to be cooperable with conveyor drive means to accommodate displacement of said endless conveyor, thereby materially prolonging the useful life of said link.

8. In a furnace for treating blanks and having an inlet and an outlet, the improvement comprising a pair of endless conveyors for receiving the blanks near the inlet, for carrying the blanks through the furnace and for discharging the blanks near the outlet, each said conveyor being comprised of a plurality of link means aligned with each other and movable in timed relation, said link means being operable to rapidly change the pitch thereof at a point near said outlet to thereby expel said blanks consecutively from said link means upon and according to demand, said conveyors further each including tie means loosely interconnecting said link means and having stop means permitting a predetermined amount of relative movement of adjacent link means away from each other at said point near said outlet to thereby change the pitch of said link means and to positively discharge a blank from a link means for each link means advanced of said conveyors.

9. A heat treating furnace comprising a heating chamber with inlet and outlet endless conveying means having a plurality of link means in series and extending through said inlet into said heating chamber, said link means being extensibly-contractibly interconnected by tie means for moving work-pieces within said heating chamber, and means for pushing said link means in surface-to-surface abutting relation through said heating chamber, for causing said link means to successively separate from said surface-to-surface abutting relation a predetermined distance permitted by said tie means for return travel through said heating chamber, and for return pulling said link means and said tie means in extended relation to the position of origination.

10. In a furnace for treating workpieces having a heat treatment chamber with an inlet and an outlet, the combination of stationary upper, lower and direction changing skid means within said treating chamber, a pair of spaced aligned conveyors movable together through predetermined travel paths through said chamber, each said conveyor comprising extensible-contractible series linkage including integral links which directly carry said workpieces through said treating chamber and tie means loosely connecting adjoining ones of said links together, said links being solely supported within said treating chamber by said skid means so as to permit said conveyors to be frictionally advanced along said upper skid means at a first pitch with said links being pushed in surface-to-surface abutting relation, said pitch being rapidly increasable a predetermined amount by means of said extensible-contractible linkage to cause said links to successively separate from said surface-to-surface abutting relation as permitted by said tie means in a downwardly directed manner as said links move past said stationary direction changing skid means near said outlet to insure positive successive discharge of treated workpieces from said links, one workpiece being discharged for each link advance of said conveyors, said links and said tie means being pullable along said lower skid means in extended inverted relation and thereafter returnable to the position of origination.

11. In a conveyor system, a conveyor link having a symmetrical body comprising means for carrying material to be treated through a controlled environment, means for receiving and retaining tie members for accommodating successive links to form an endless conveyor, and drive engaging means symmetrical with respect to said link and cooperable with conveyor drive means to accommodate displacement of said endless conveyor, said drive engaging means being orientatable by reversing the position of said link to be cooperable with said conveyor said drive means in a reverse orientation, thereby materially prolonging the useful life of said link.

References Cited

UNITED STATES PATENTS

| | | | |
|---|---|---|---|
| 443,769 | 12/1890 | Hurford | 198—189 X |
| 976,483 | 11/1910 | Mitchell | 263—8 X |
| 1,739,497 | 12/1929 | Beach | 263—8 |
| 1,906,659 | 5/1933 | Talley | 198—203 X |
| 2,487,355 | 11/1949 | McNamara et al. | 263—8 X |
| 2,615,701 | 10/1952 | Ipsen | 263—8 |

CHARLES J. MYHRE, *Primary Examiner.*

JOHN J. CAMBY, *Examiner.*